Jan. 2, 1945.  W. R. KOCH  2,366,628
WAVE FREQUENCY MONITOR
Filed Dec. 16, 1942  2 Sheets-Sheet 2

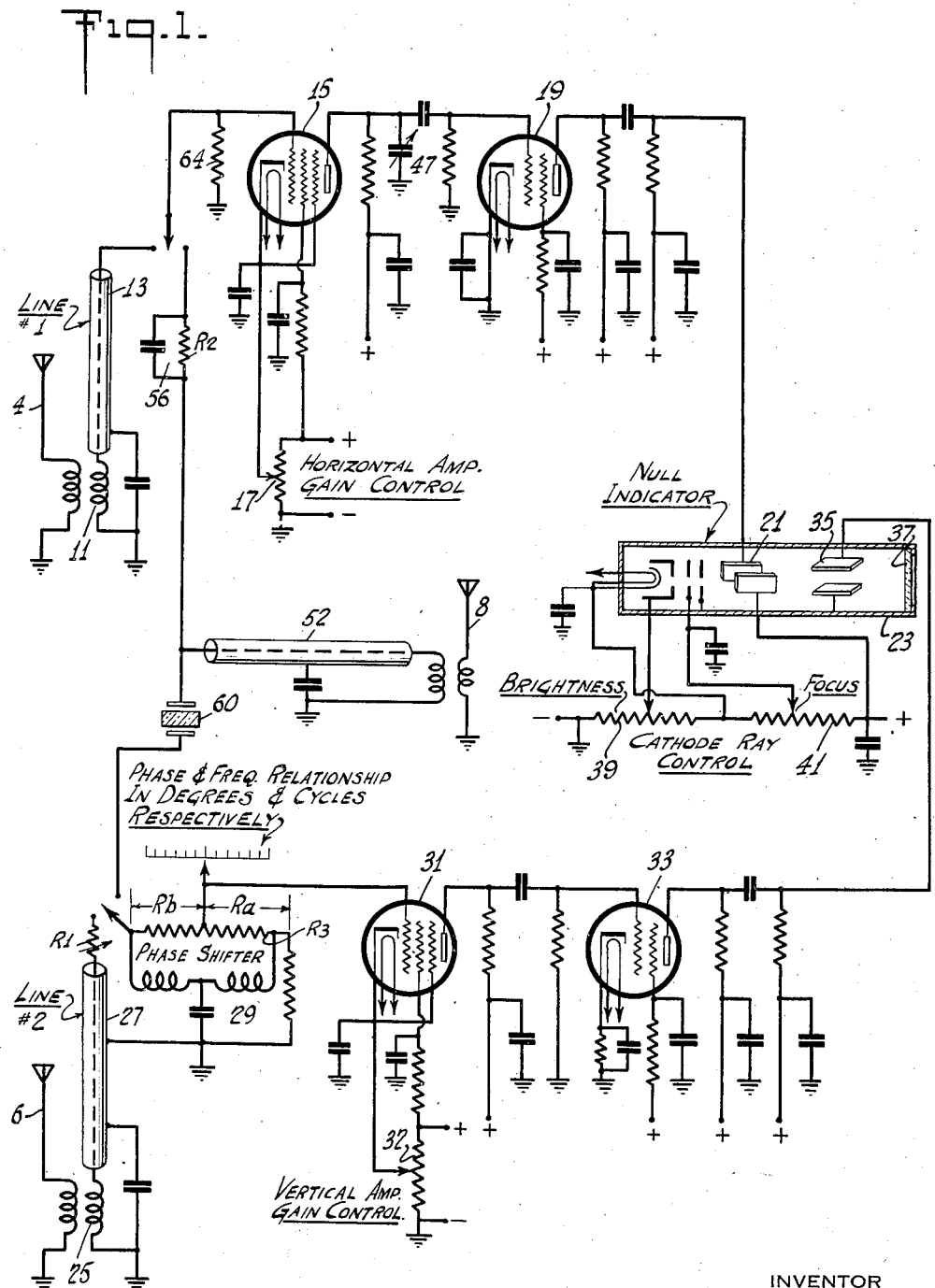

FREQUENCY AT
RESONANCE

FREQUENCY ABOVE
RESONANCE

FREQUENCY BELOW
RESONANCE

INVENTOR
WINFIELD R. KOCH.
BY H. S. Grover
ATTORNEY

Patented Jan. 2, 1945

2,366,628

UNITED STATES PATENT OFFICE 2,366,628

WAVE FREQUENCY MONITOR

Winfield R. Koch, Haddonfield, N. J., assignor to Radio Corporation of America, a corporation of Delaware Application December 16, 1942, Serial No. 469,236

8 Claims. (Cl. 250—17)

In this application I disclose a new and improved method of and means for conditioning an antenna phase monitoring device for the monitoring of the frequency of a source of wave energy, such as a communications system, broadcast station, or television system.

Many broadcast stations have an antenna phase monitor. By adding a simple quartz-resonator as shown, the phase monitor can be used to show the frequency deviation of the transmitter as well. In a particular application of my invention Radio Corporation of America antenna phase monitor equipment, such as illustrated in Brown U. S. Patent No. 2,176,120 is used.

In accordance with my invention, I provide means to convert frequency changes in wave energy to corresponding phase changes which are then applied with original wave energy to a phase monitor of the type disclosed in the Brown patent, which is also then provided with a scale that is calibrated in frequency. On other makes of apparatus using an indicator type meter, an additional scale in cycles could be added to permit direct reading of frequency deviation.

The converting means may include a quartz-resonator or the equivalent circuit elements.

In describing my invention, reference will be made to the attached drawings wherein:

In Figure 1 I have shown a phase monitor with means associated therewith for monitoring frequency deviations in wave energy;

Figure 2:
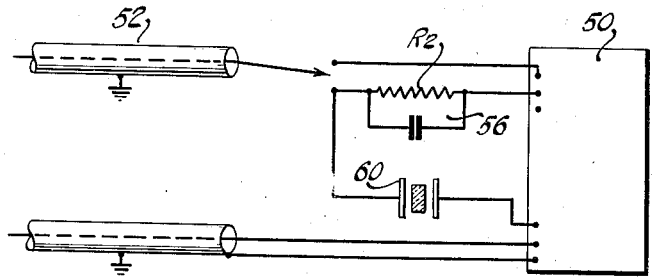
Figure 2 is a simplified showing of the arrangement of Figure 1.
Figure 4:
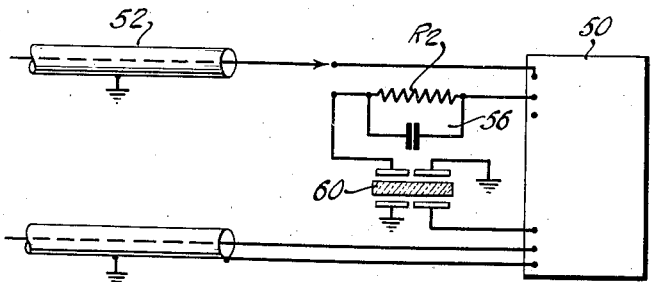

While Figure 4 illustrates a modification of the arrangement of Figures 1 and 2.

In Figure 1 a pick-up coil 11 is connected through a suitable transmission line 13 to the input circuit of an amplifier 15. The gain of the amplifier 15 may be controlled by potentiometer 17 or the like. The output of the amplifier 15 is preferably resistance coupled to a second amplifier 19. The output of the second amplifier 19 is coupled through a resistive network to the horizontal deflecting electrodes 21 of cathode ray tube 23.

A second pick-up coil 25 is connected to a transmission line 27. The output of the transmission line 27 is connected to the phase shifting network 29. The output of the phase shifting network 29 is connected to an amplifier 31, which is preferably of the resistive coupled type and the gain of which is adjusted by potentiometer 32. The output of the amplifier 31 is impressed upon the input of the second amplifier 33, whose output circuit is coupled through a resistive network to the vertical deflecting electrodes 35 of the cathode ray tube 23.

In the present instance, the cathode ray tube 23 is of the metal envelope type with the usual glass end 37, which is suitably coated with fluorescent material. The brightness of the cathode ray trace is controlled by a potentiometer 39 and the focus of the cathode ray is controlled by a second potentiometer 41. The potentiometers 39 and 41 are shunted across any suitable power source, such as a rectifier and filter as shown in said Brown patent. The same power supply may be used to energize the amplifier tubes 15, 19, 31, 33 and the cathode ray tube 23. The required voltages may be obtained by potentiometer connection as in the said Brown patent.

The purpose of the phase shifter 29 is to shift the phase of the current supplied out of the shifter to the grid of tube 31 relative to the phase of the current supplied to the phase shifter by the line 27 from the antenna 6.

This phase shifting network shown at 29 comprises an artificial quarter wave line. The line consists of series inductance, a shunt capacity and a terminating impedance as described more in detail in said Brown patent. This quarter wave line is connected to the transmission line through a variable resistor R1. The phase shift in the quarter wave line 27 is about 90°. By connecting a potentiometer R3 across the inductance of the phase shifter, the phase of the voltage applied to the control grid of amplifier tube 31 may be shifted by moving the potentiometer arm. When the adjustable arm of R3 is in the one extreme position, the phase shift will be 0°. When the arm is in the other extreme position, the phase shift will be 90°.

The antenna 4 is coupled by the line 13 directly to the grid of tube 15 so that the approximately 90° phase shift taking place in the line 13 is the only shift that need be considered.

The antenna 4 and 6 may be of a directive array comprising a transmitter coupled by suitable means to the pair of antennas 4 and 6. Pick-up coils 11 and 25 are shown coupled to the antennas. The phase indicator or monitor is as disclosed more in detail in said Brown patent No. 2,176,120 used to check the phase relation of the antenna currents and in doing so the following procedure is followed.

The phase shifting network 29 may be calibrated from the formula $$\frac{Ra}{Rb} = \tan \theta$$

in which $\theta$=the phase shift in degrees and $Ra$= the ohmic resistance of one arm of the potentiometer, while $Rb$=the ohmic resistance of the other arm of the potentiometer. The ohmic resistance of the line matching resistor should be serially included with $Rb$ of the potentiometer when the calibration is made. This calibration is sufficiently accurate for most practical purposes. The calibration has been checked by applying currents which have been shifted through known phase angles by means of electrical lines whose phase delay in electrical degrees have been previously determined.

After the potentiometer has been calibrated, the in-phase condition of the cathode ray tube and its associated amplifiers is checked by connecting the input circuits to a common source with the arm of potentiometer R3 at the switch end or 0° phase shift position. If there is no phase shift in the amplifiers, the cathode ray trace on the screen 37 will be a straight line, which takes an angle of 45° with respect to the plane parallel to the deflecting elements 35. Inasmuch as the amplifiers may have some slight phase shift, it is desirable to employ a variable capacitor 47 at the output of tube 15 which enables the user to adjust the phase shift of one of the amplifiers until the two amplifiers are the same. Under these conditions, the cathode ray trace will be a straight line, while phase shift in either amplifier is indicated by an elliptical trace. The input of amplifier 15 is then connected to line #13 and the phase shifter 29 is connected to line #2. If currents are now impressed on the pick-up coils 11 and 25, these currents will be amplified. The amplified currents will deflect the cathode ray which will indicate phase shift by an elliptical trace. If the potentiometer of the phase shifter 29 is carefully adjusted, the phase shift can be altered until the effect of the two currents on the cathode ray indicates 0° or 180° phase shift. The direction of slope of the line or trace indicates whether the applied currents are in phase or 180° out of phase. The amount of phase shifting which is required to obtain this indication is the difference in phase angle between the currents which have been impressed upon the pick-up coils 11, 25. This angle may be determined directly from the calibration previously made.

The apparatus measures phase angle of two currents by shifting the phase angle of one of the currents until the resultant is exactly in phase or 180° out of phase as indicated by the trace on a cathode ray tube. Using this means, a small departure from the in-phase or 180° condition is readily indicated by the resulting elliptical trace of the cathode ray. When the in-phase condition is obtained, the phase angle is directly indicated by the amount by which the phase of one of the currents had to be changed in order to become in phase with the other current. The foregoing means utilizing essentially a null method is not only well adapted to accurately measuring phase angle, but the system may be used to monitor the currents in a directional antenna array.

In Figure 2 I have illustrated one means for converting wave length variations on wave energy into corresponding phase changes and applying the said wave length varied wave energy and converted wave energy to the phase monitor. 50 represents the monitor. 52 represents a line feeding wave energy to the monitor from an antenna which may be either of the antennas 4 and 6 and 8 of Figure 1, or any antenna. The line may feed the energy to be monitored at its original frequency if the same is appropriate or at a different frequency appropriate for the monitor, which different frequency is obtained by heterodyning the antenna current against oscillations of fixed frequency.

The current to be monitored is fed to the resistance and condenser 56, Figures 1 and 2, and thence to one of the amplifiers in the phase monitor. For illustration, it is shown in Figure 1 as being fed to amplifier stages 15 and 19. The current is also fed to the crystal 60 and thence to the other amplifier of the phase monitor. For purposes of illustration, the crystal is shown in Figure 1 as feeding the stages including tubes 31 and 33 by way of the phase shifter 29. I may connect the converter in such a manner that the current from the resistance of 56 passes through the phase shifter to the stage 31 and the current from the crystal 60 is fed substantially directly to the stage 15.

Figure 3A:
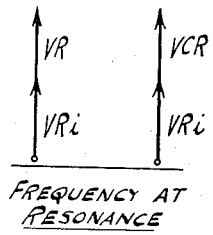
Figures 3a, 3b and 3c are vector diagrams showing the operation of the converting circuit of Figures 1 and 2.
Figure 3B:
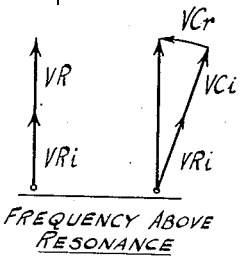
Figure 3C:
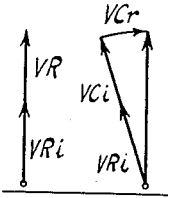

The phase relation of these two currents is illustrated in Figures 3a, 3b and 3c, wherein $VR$ is the voltage drop across R2. $VCR$ is the voltage across the crystal. $VRi$ is the voltage across the monitor input resistance, which includes 64, Figure 1. $Vci$ is the voltage drop across the reactive component of the crystal impedance and $VRi$ is the voltage drop across the resistive component of the crystal impedance.

In practice, to check the frequency of the transmitter, the operator would first check the zero phase reading of the phase monitor, as described above, then switch in the crystal 60 and R2, Figures 1 and 2, and measure the phase angle between the crystal arm and the R2 arm. Reference to a chart then gives the deviation of the transmitter frequency. The chart is supplied along with the crystal and may be plotted either by measuring the phase angles at the factory with similar equipment, or the values may be calculated from the crystal constants. The potentiometer R3 may be calibrated in frequency difference in cycles as well as in phase difference in degrees so that direct readings of frequency difference may be made.

In explaining the operation of the circuit, the crystal can be replaced by its equivalent electrical constants, a capacitor shunted by a series resonant circuit having R, L and C. At resonance the series inductive reactance and capacitive reactance of the crystal are equal and cancel each other. The crystal is then the equivalent of the R and C in the other arm of the circuit and the resulting phase angle measured by the phase monitor will be zero. In a suitable holder, the reactance of the shunt capacity of the crystal will be at least 100 times the resistance of the crystal, and this capacity may be disregarded except for precise calculations. For frequencies slightly lower than resonance, the crystal is equivalent to a resistor in series with a capacitor. The current in the crystal arm will, therefore, lead the current in the other arm. If the R, L and C of the crystal and the input resistance of the phase monitor are known, the frequency deviation can be readily calculated from the measure phase angle. If the frequency of the transmitter is higher than resonance, the crystal is equivalent to a resistor in series with an inductance, and the phase angle measured will be of opposite sign. In calculating the frequency deviation from the measured phase angle, use may be made of the formula given in Radio Engineers Handbook by Henney.

$$\phi = \tan^{-1} Q\left(n - \frac{l}{n}\right)$$

where $\phi$ is measured angle $Q$ is $\frac{\omega r L}{R}$ $n$ is $\frac{\omega l}{\omega r}$ $l$ is $2_\pi$ times actual frequency
$r$ is $2_\pi$ times resonant frequency
$L$ is equivalent inductance of crystal
$R$ is equivalent resistance of crystal plus input resistance of phase monitor.

On the phase monitor described, if the phase adjustment is left fixed at the in-phase or zero angle position, a change in applied frequency is indicated by a change from a line on the cathode ray tube screen to an ellipse. By calibrating the screen, to indicate the amount of spreading of the two sides of the ellipse that corresponds to the allowable frequency variation, the operator needs only to glance at the screen to tell if the transmitter is within the prescribed frequency limits. Furthermore, this method indicates rapid variations in frequency such as might be caused by hum modulating the phase or frequency of the transmitted carrier. Such variations are not detectable with meter-type frequency monitors.

By using a crystal having a low temperature coefficient, the necessity of an oven would be avoided. This is especially true of resonator crystals which are worked at a voltage so low that the losses in the crystal are low and do not tend to heat up the crystal. Because of the low resistances associated with the phase monitors, the capacities associated with the crystal affect the calibrations but little.

If the crystal equivalent resistance is the same as the characteristic impedance of the line, the line will be matched when measuring frequency deviation, but this is not necessary, and a mismatch may in some cases be desired in order to secure a step up in voltage to compensate for that lost in the crystal. The desired frequency range can be secured by adjusting the amount of resistance in the crystal circuit or the crystal input or output shunting resistance. The vector relations of the various voltages for a crystal having a resistance component the same as the characteristic impedance of the line is shown in Figure 3.

If desired, the crystal can be ground to a definite number of cycles off the desired frequency, so that a normal reading in the middle of the scale will be secured.

If a zero temperature coefficient crystal is not used, an oven may be used, or a series capacitor having a temperature coefficient of opposite sign and of such value as to just compensate for the temperature coefficient of the crystal in which case it would be desirable to design the circuit such that the crystal resistance is small compared with the terminating resistor, so that as the equivalent resistance of the crystal changes by the series capacitor, the circuit impedance is only slightly affected.

In Figure 4 I have illustrated another embodiment of my system. Here a multi-electrode crystal replaces the two-electrode crystal of Figures 1 and 2. The principle of operation is the same, however. The equivalent shunt capacity of the crystal is considerably reduced by this circuit. A phase shift of 180° occurs through the crystal at its resonant frequency.

What is claimed is:

1. In a wave frequency monitor, the combination with means to compare the phases of two waves of the same frequency, of a circuit of a characteristic uniform over a band of frequency for feeding current the frequency of which is to be monitored to said means in place of one of said waves and a circuit responsive to frequency changes for feeding current the frequency of which is to be monitored to said means in place of the other of said waves.

2. In a wave frequency monitor, the combination with a phase monitor including connections to which may be applied two waves of substantially like frequency but of phases which may be displaced to compare the phases of the two waves, of a source of wave energy the frequency of which is to be monitored, a circuit having a characteristic uniform over a band of frequency for feeding current from said source to said connections, and a circuit responsive to frequency changes for feeding current from said source to said connections.

3. In apparatus for adapting a phase monitor having means including two amplifiers with means for applying two waves of substantially like frequency in phase selected relation to the amplifiers to compare the phases of said two waves to use as a frequency meter, an antenna system excited by current the frequency of which is to be metered, a circuit having a characteristic uniform over a band of frequency for feeding current from said antenna to one of said amplifiers of said phase monitor in place of one of said waves and a circuit responsive to frequency changes for feeding current from said antenna to the other of said amplifier of said phase monitor in place of the other of said waves.

4. In means to adapt a phase monitor, including two amplifiers with means for applying two waves of substantially like frequency in phase selected relation to the amplifiers to compare the phases of said two waves, to the monitoring of the frequency of wave energy, a circuit having a characteristic uniform over a band of frequency for feeding said wave energy to one of said amplifiers, and a circuit responsive to frequency changes for feeding said wave energy to the other of said amplifiers of said phase monitor.

5. In a wave frequency monitor the combination with a phase monitor having means including two amplifiers of adjustable gain feeding a phase displacement indicator with means including a phase adjuster for feeding wave energies of substantially like frequency from two antenna systems to the said amplifiers, of a circuit having a characteristic which is uniform over a band of frequency for feeding current the frequency of which is to be monitored to one of said amplifiers, and a circuit responsive to frequency changes for feeding current the frequency of which is to be monitored to the other of said amplifiers through said phase adjuster.

6. In a wave frequency monitor the combination with a phase monitor including two amplifiers of adjustable gain feeding a phase displacement indicator with connections including a phase adjuster for energy fed to one of said amplifiers and other connections for feeding wave energy of substantially like frequency substantially directly to the other of said amplifiers, of a circuit having a characteristic which is uniform over a band of frequency for feeding current the frequency of which is to be monitored to said first connections, and a circuit responsive to frequency changes for feeding current the frequency of which is to be monitored to the other of said connections.

7. Means for adapting a phase monitor to the metering of the frequency of wave energy, said phase monitor comprising apparatus for indicating the phase of current with respect to the phase of other current used as a reference, including, two tube relays each having an input and an output, wave phase comparing means coupled to the outputs of the relays, and a calibrated phase shifter coupled to the input of one relay, the arrangement being such that when alternating current is impressed on the input of one relay and on the input of the other relay through the calibrated phase shifter the phase of the said alternating currents with respect to the phase of said other current used as a reference can be ascertained, said adapting means comprising two paths for impressing wave energy the frequency of which is to be monitored on the inputs of said relays, one of said paths including said phase shifter and means in one of said paths for converting changes of frequency of the wave energy therein into corresponding changes in phase of the wave energy therein.

8. Means for adapting a phase monitor to the metering of the frequency of wave energy, said phase monitor comprising a cathode ray tube with ray producing means, two ray deflecting elements effectively angularly related and a target on which the ray may be observed and two amplifier systems each having an output and an input with the output of one amplifier coupled to one deflecting element and the output of the other amplifier coupled to the other deflecting element with a phase shifter coupled to the input of one amplifier, the arrangement being such that when alternating current is impressed on the input of one amplifier and alternating currents of the same frequency is impressed on the input of the other amplifier by way of the phase shifter, the phase relation of the said currents with respect to the phase of a current of the same frequency can be ascertained, said adapting means comprising two paths for impressing wave energy the frequency of which is to be metered on the inputs of said amplifiers, one of said paths including said phase shifter, and reactance in one of said paths for converting changes of frequency of the wave energy in said one path into corresponding changes in the phase of the wave energy in said one path.

WINFIELD R. KOCH.